Oct. 17, 1961 C. K. TAFT Re. 25,058

MOTOR CONTROL SYSTEM

Original Filed Dec. 15, 1958 3 Sheets-Sheet 1

INVENTOR.
CHARLES K. TAFT
BY
Williams, David, Hoffmann & Yount
ATTORNEYS

MOTOR CONTROL SYSTEM

Original Filed Dec. 15, 1958 3 Sheets-Sheet 2

INVENTOR.
CHARLES K. TAFT
BY
Williams, David, Hoffmann & Jaunt
ATTORNEYS

INVENTOR.
CHARLES K. TAFT
BY
Williams, David, Hoffmann & Yount
ATTORNEYS

United States Patent Office

Re. 25,058
Reissued Oct. 17, 1961

25,058
MOTOR CONTROL SYSTEM

Charles K. Taft, Warrensville Heights, Ohio, assignor to The Warner & Swasey Company, Cleveland, Ohio, a corporation of Ohio Original No. 2,977,522, dated Mar. 28, 1961, Ser. No. 780,377, Dec. 15, 1958. Application for reissue May 8, 1961, Ser. No. 108,684
9 Claims. (Cl. 318—260)

Matter enclosed in heavy brackets [ ] appears in the original patent but forms no part of this reissue specification; matter printed in italics indicates the additions made by reissue.

The present invention relates to a thyratron motor control system and, more particularly, to a system for operating a motor at a rate determined by an electrical signal.

An important object of the present invention is to provide a new and an improved motor control system, particularly a thyratron motor control system, for effecting operation of a motor at a rate dependent on an electrical control signal which is variable to vary the rate of operation of the motor, the action of the system when the motor is under varying load being greatly improved over prior art systems.

Another object of the present invention is to provide a thyratron motor control circuit for operating a motor in accordance with an electrical control signal applied to the grid of the thyratron, the electrical control signal including a first component having a magnitude indicative of the desired rate of movement and a second component dependent on armature current which is effective to minimize changes in motor speed due to changes in load, and the system being such that the second signal component does not adversely affect the operation of the system upon changes in armature current in response to changes in magnitude of the first component.

A further object of the present invention is to provide a new and an improved thyratron motor control system wherein the signal applied to the grid of the thyratrons includes a control signal component indicative of the desired rate and directions of movement and components indicative of motor velocity, armature current and motor acceleration to provide a control system which is fast in its response to changes in the control signal component and which is subject to a minimum of hunting and overshooting.

A still further object of the present invention is to provide a motor control system for a reversible motor which effects operation of the motor in a direction dependent upon the phase of an A.C. control signal and in which an A.C. feed-back signal is derived from the armature circuit and has a phase which reverses upon direction of operation of the motor and is combined in additive relationship to the control signal to effect operation of the motor.

The invention also contemplates the provision of a control circuit for a reversible D.C. motor which effects operation of the motor at a rate and in a direction dependent upon the magnitude and phase of an A.C. control signal and in which A.C. signal components having phases dependent upon the direction of operation of the motor and magnitudes dependent upon the speed of the motor and motor armature current, respectively, are combined with the control signal to provide fast response with a minmum of hunting.

Further objects and advantages of the invention will be apparent from the following detailed description of the preferred embodiment thereof made with reference to the accompanying drawings in which.

The present invention provides a motor control system for operating a direct current motor in accordance with an A.C. signal having a magnitude indicative of the desired motor speed and, preferably, a phase indicative of its direction of operation. The system is useful where it is desired to provide a motor which responds quickly to changes in the signal with a minimum of hunting and overshooting.

Figure 1:
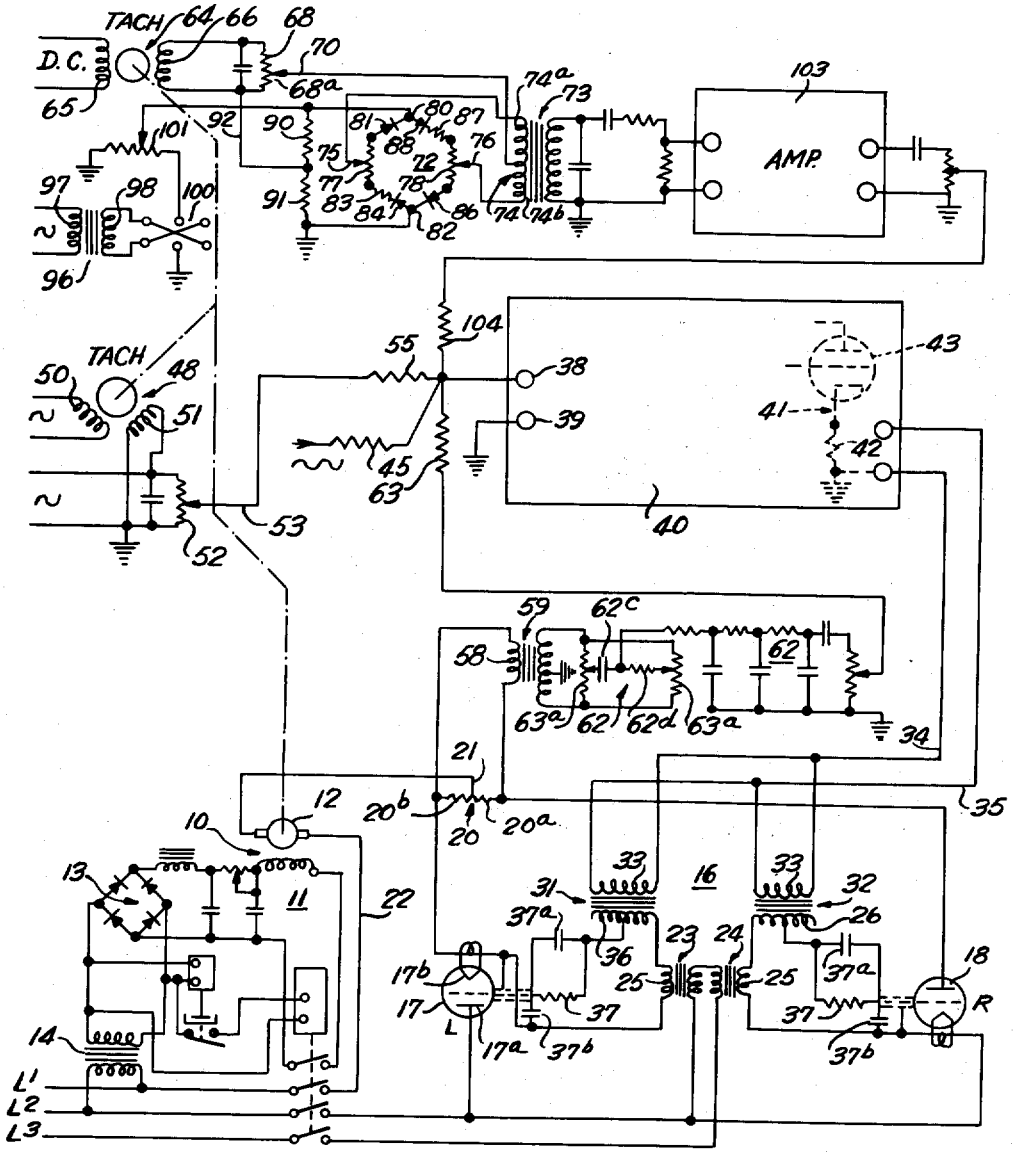
FIG. 1 is a diagrammatic electrical diagram of the preferred embodiment of a motor control system.

Referring to FIG. 1, a D.C. motor 10 having a field winding 11 and an armature 12 is shown as energized from power lines L1, L2 of a 3-phase power supply comprising lines L1, L2, L3. The field coil 11 is connected into the output of a full wave rectifier 13 in the secondary circuit of a transformer 14 having its primary connected across L1 and L2. The armature circuit of the motor is energized from the power lines L1, L2 through a power amplifier 16 including *electric rectifying valves having principal electrodes which will conduct in one direction when a predetermined voltage is applied to a control element of the valve. The valves are shown as* gas rectifying tubes, or thyratrons, 17, 18 for rectifying the current supplied to the armature 12. The thyratrons 17, 18 are connected in back-to-back relationship so that the tubes are oppositely phased and have their plates going positive on different half cycles of the alternating current appearing across lines L1, L2. The tube 17 has its plate 17a connected directly to the line L2 and its cathode 17b is connected to plate 18a of tube 18 by a resistance 20 having a center tap 21 connected to one side of the armature 12, the other side of the armature 12 being connected directly to L1 by a connection 22. From the described circuit, it will be understood that current flow in the motor circuit through tube 17 can take place only on the particular half cycle where L2 is positive with respect to L1 and the current flow will be from L2 to L1. On the other hand, current flow through the tube 18 can only take place on the half cycle where L1 is more positive than L2 and current flow will be in a reverse direction through the armature from L1 to L2 through the tube 18. Therefore, if only tube 17 conducts, the motor operates in one direction and if only tube 18 conducts, the motor will operate in the opposite direction. If both the thyratrons 17 and 18 are conductive on their respective half cycles, the motor will not operate if each is conductive for the same period during its half cycle, since the average armature current is zero, but if one thyratron or the other conducts for a greater portion of its respective half cycle, there will be an average current flow in the direction that the particular thyratron conducts and the motor will rotate in the direction which corresponds to that direction of current flow.

Figure 2:
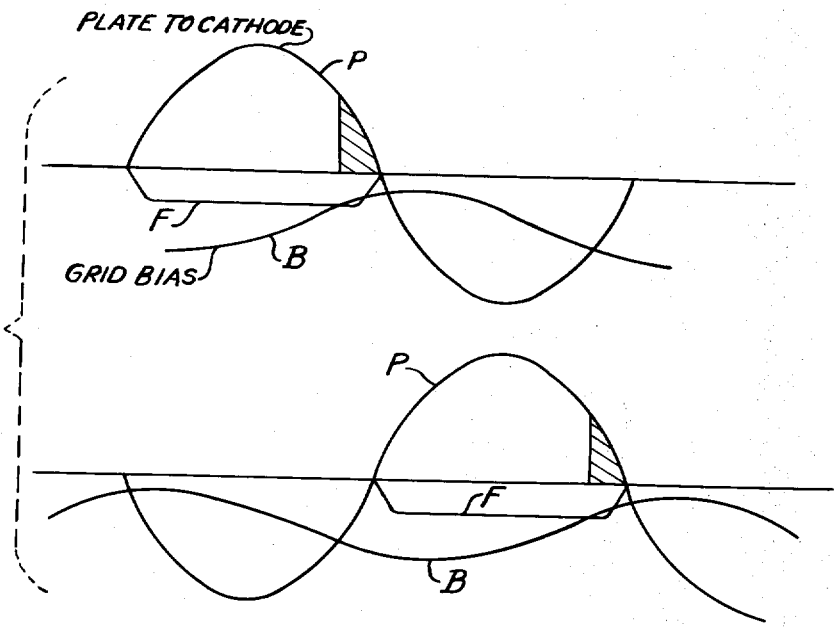
FIGS. 2 and 3 are diagrams showing the relationship of the voltages applied to the rectifying tubes of the motor control system of FIG. 1.

In the illustrated embodiment, the thyratrons are biased so that each will conduct for a short period at the end of their respective cycles, with the period of conduction for each thyratron being the same. To this end a grid to cathode voltage which is 120° out of phase with the voltage appearing across lines L1, L2 is applied to the grid circuits of the thyratrons 17 and 18. The A.C. grid biasing votlage is coupled into the grid circuits of each of the thyratrons 17, 18 through transformers 23, 24, respectively, having primary coils connected in series across L2 and L3 and secondary coils 25 connected into the grid circuits of their respective thyratrons. The secondary coils 25 are connected so that the grid voltages supplied by the transformers 23, 24 are 120° out of phase with the plate to cathode voltages on the tubes 17, 18, respectively, and effect conduction for a short period of each of the half cycles in which the plate of the thyratron is positive with respect to the cathode. Preferably, each thyratron has a negative D.C. grid bias applied thereto which in effect lowers the zero line of the A.C. grid biasing voltage and providing a resultant A.C. biasing voltage as shown by curves B in FIG. 2. The lowering of the A.C. bias voltage causes the bias voltages derived from the transformers 23, 24 to intercept the critical grid to cathode voltage firing curves of the thyratrons later in the plate to cathode voltage curve than would otherwise be the case. As is well understood, a thyratron conducts when the grid-cathode voltage curve intercepts the critical grid to cathode voltage firing curve for the plate to cathode voltage of the tube. The critical grid firing curves for the thyratrons are shown in FIG. 2 and are designated by the reference character F, while the plate to cathode volatge curves are designated by the reference character P.

If a control voltage of the same phase or opposite phase with respect to the voltage appearing across L1 and L2 is introduced into the grid circuits of tubes 17 and 18 so that the grid to cathode voltage on each thyratron is in phase with the grid to cathode voltage on the other thyratron, the resultant grid voltage on the thyratrons 17, 18 tends to increase the conductive portion of one tube and to decrease the conductive portion of the other. If the control signal is of the same phase as the voltage appearing across L1—L2, the signal will be in phase with the plate to cathode voltage of the tube 18 and out of phase with the plate to cathode voltage of the tube 17 and will tend to increase the period of conduction of the tube 18 and decrease the period of conduction of the tube 17. If the phase of the signal is reversed, it will increase the period of conduction of tube 17 and decrease the period of conduction of the tube 18.

Figure 3:
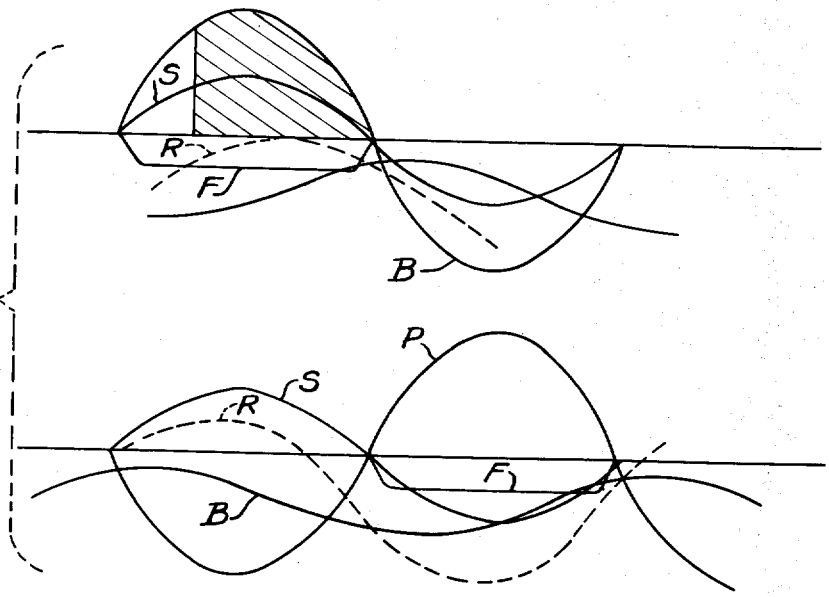

A control signal whose phase and magnitude determine which of the thyratrons 17 and 18 becomes increasingly conductive and which becomes decreasingly conductive is introduced into the grid circuits of the tubes 17 and 18 through transformers 31, 32 having primaries 33 connected across a pair of terminals 34, 35 and secondaries 36 connected into the grid circuits of the thyratrons 17 and 18, the transformer 31 having its secondary connected into the grid circuit of the thyratron 17 and the transformer 32 having its secondary connected into the grid circuit of the thyratron 18. The connections of the transformers 31, 32 are such that when an alternating current in phase with the voltage from L1 to L2 is applied to the terminals 34, 35, the grid to cathode voltage introduced by the transformers 31, 32 will be in phase with the plate to cathode voltage across the tube 18 and out of phase with the grid to cathode voltage across the tube 17 and if the phase is reversed, the voltage appearing between the grid and cathode of tube 17 will be in phase with the plate to cathode voltage of the tube, and the grid to cathode voltage of the tube 18 will be out of phase with the plate to cathode voltage of the tube 17. Referring to FIG. 3, the resultant grid voltage appearing on the tubes 17 and 18 when an alternating current signal as described appears across the terminals 34, 35 becomes more positive for the conductive half cycle and is shifted to the left for one of the tubes 17, 18, and becomes more negative and is shifted toward the right for the other tube. The amount the resultant grid votlage is shifted is determined by the magnitude of the signal voltage. This increases the conduction of one tube and decreases the conduction of the other tube to control the operation of motor 10. In FIG. 3, the control voltage curve has been designated by the reference character S and has been shown as in phase with the plate voltage of tube 17 and the resultant grid current is shown by the curve R. It will be understood that the higher the magnitude of the voltage at terminals 34, 35, the greater shifting of the resultant grid curve, and the longer is the period of conduction in its conductive half cycle of the thyratron which is becoming increasingly conductive.

The secondary coils 36 of the transformers 31, 32 are center-tapped coils and the center tap of each coil is connected to the grid of the corresponding thyratron by a resistor 37 having a condenser 37a connected in parallel therewith while one end of each secondary coil 36 is connected to the corresponding cathode through the secondary coil 25 of the associated one of the transformers 23, 24. The grid of each thyratron is also connected to the cathode of the thyratron by a condenser 37b. The grid current drawn by the thyratrons effects a charging of the condensers in the grid circuit to provide the heretofore described negative bias on the thyratrons.

The signal voltages appearing at terminals 34, 35 is, in the illustrated and preferred embodiment, a combined signal of four voltages applied to the input terminals 38, 39 of an amplifier 40 having a cathode follower output stage 41. The cathode follower output stage includes a resistor 42 connected into the cathode circuit of a triode 43 and the output of amplifier 40 is taken across the resistor 42 and is applied to the terminals 34, 35.

One of the voltages applied to the input terminals 38, 39 is a control voltage which is applied through an input resistor 45 having one end connected to the input terminal 38. The voltage applied through the resistor 45 has a phase indicative of the desired direction of operation of the motor 10 and a magnitude which is indicative of the desired speed of operation. The frequency of the signal is the same as the frequency of the power supply represented by lines L1, L2, L3. The signal applied through the input resistor 45 is amplified by the amplifier 40 applied to the input terminals 34, 35 of the power amplifier 16, and if of one phase, the motor operates in one direction, and if of the opposite phase, the motor operates in the other direction, the phase of the signal when it appears at terminals 34, 35 being that required to effect operation of the circuit in the manner described above and is preferably in phase or out of phase with the voltage L1—L2.

As the motor is operated in response to the control signal applied through the input resistor 45, a velocity feed-back signal is developed which is applied to the input of amplifier 40 in opposition to the control signal applied through the resistor 45. The velocity feed-back signal is derived from a tachometer 48 of conventional construction. The tachometer 48 is preferably what is known as a drag cup tachometer and includes a field coil 50 and an output coil 51. The field coil 50 is energized with an alternating current and a voltage appears across the output coil 51 which is an A.C. signal of the same frequency of the exciting current for the tachometer, i.e., the frequency of the power supply for L1, L2, L3 in the illustrated embodiment, and which has a phase dependent upon the direction of operation of the motor 10 and a magnitude determined by the speed of the motor. A resistor 52 having a sliding tap 53 is connected across the output coil 51 of the tachometer 48 and the sliding tap 53 is connected to the input terminal 38 of the amplifier 40 through an input resistance 55. One side of the resistor 52 is grounded and, therefore, a portion of the voltage appearing across the resistor 52 is applied as a feed-back signal to the input of amplifier 40. The connections are made so that the signal from the tachometer 48 is of opposite phase to the control signal applied through the input resistor 45. During operation, a balance is reached between the signals applied through the resistor 45 and the resistor 55 to effect operation of the motor 10 at a given speed for a given magnitude of the control signal. If the speed of the motor should then tend to increase, the increase in the feed-back signal applied to the resistor 55 would effectively tend to decrease the magnitude of the control signal being applied to effect a compensation and a return to the speed dictated by the magnitude of the control signal applied through the resistor 45.

Load changes will affect the speed of operation of the motor and it is desirable that these load changes be anticipated. To this end, the primary 58 of a transformer 59 is connected across the resistance 20 in the armature circuit of the motor 10. It will be noted that regardless of which one of the thyratrons 17, 18 is conducting, the polarity of the voltage applied to the transformer 58 will be the same. If the thyratron 18 is conducting for longer periods than the thyratron 17 the average current flow is from the center tap 21 of the resistance 20 through the resistance portion 20a to the plate of thyratron 18 which, in effect, means that the side of the primary coil 58 connected to the end of the resistance portion 28 is negative and the other side of the primary coil 58 is positive. If the average current flow in the armature circuit is in the direction of conduction of the thyratron 17, the direction of current flow is from the cathode of the thyratron 17 through a resistance portion 20b of the resistance 20 to the center tap 21, and from the center tap 21 to the armature 10. This, again, means that the side of the primary 58 of the transformer 59 connected to the end of the resistance portion 20a is effectively negative. The current in the primary 58 of the transformer 59, however, will be a pulsating current and the pulses will have one phase or the opposite phase depending upon which one of the thyratrons 17 or 18 is conducting. The output of the transformer 59 will, therefore, be a pulsating current having a phase which depends upon the direction of motor torque. The pulsating current is smoothed to approximate a sine wave by a filtering circuit 62 and is applied through a resistor 63 to the input terminals of the amplifier 40 in additive relationship, or in phase, with the voltage applied through the input resistor 45. The magnitude of the A.C. feed-back signal derived from the armature circuit is dependent upon the magnitude of the armature current. If the load tends to increase, the armature current will tend to increase and this will be reflected in the input of the amplifier 40 and, in turn, in the input of the power amplifier 16 to effect an increase in armature current to anticipate the load change.

In the illustrated embodiment the secondary of the transformer 59 is a center-tapped coil 59a connected to the filtering circuit 62 through a magnitude and phase shift control circuit 62a. The center tap of coil 59a is grounded and the circuit 62a includes a pair of potentiometer-type resistors 62b connected in parallel across the secondary coil 59a of the transformer 59 and having movable taps connected to one side of the filtering circuit 62, the other side of the circuit 62 being grounded. The movable tap of one of the resistors 62b is connected to the filtering circuit 62 through a condenser 62c and the other resistor 62b is connected to the filtering circuit 62 through a resistor 62d. The movable taps of the resistors 62b are adjustable to control the magnitude and phase of the voltage across the filtering circuit 62.

The feed-back signal derived from the armature circuit of the motor may, under certain conditions, adversely affect the response of the motor to the control signal. If the magnitude of the control signal should be increased suddenly to effect a desired change in the speed of the motor, the control signal will cause an increase in current in the armature circuit to effect the change of speed. While this increase in current is not due to an anticipated load change, the feed-back signal derived from the resistance 20 will act in the same manner as when the load is increased to further increase the armature current and this will tend to cause the motor to overshoot the desired speed. In accordance with the present invention, a third feed-back signal is preferably provided whenever the motor is quickly accelerated or decelerated. This third feed-back signal is applied to the input of amplifier 40 in bucking relationship for accelerations of the motor to the control signal applied through the input resistor 45 and to the feed-back signal from the armature circuit. To this end, an acceleration tachometer 64 is driven from the armature 12 of the motor 10.

The acceleration tachometer 64 is a conventional, commercially available tachometer having an exciting coil 65 energized by direct current and an output coil 66, and may be the same as the drag cup tachometer 48 but with the field coil 65 energized by a direct current. When the field coil of a drag cup tachometer is energized with D.C. the tachometer produces an output signal only when the motor is accelerating or decelerating and if the motor is accelerating while rotating in one direction, the output signal has one polarity and if decelerating while rotating in the same direction, the output signal is of the opposite polarity. When the direction of rotation of the motor is reversed, the polarity of the signal for acceleration and deceleration is also reversed. Referring to FIG. 1, the output coil 66 of the tachometer 64 is connected across a resistor 68 having a movable tap 70 which is adjustable to select a portion of the voltage appearing across the resistor 68.

The output signal from the tachometer 64 is converted to an alternating current and fed back to the input of amplifier 40. The output signal from the tachometer 64 is converted to an alternating current signal by a chopper bridge circuit 72 and a transformer 73 having a center-tapped primary coil 74 having coil portions 74a, 74b on opposite sides of the center tap. The movable tap 70 of the resistor 68 is connected to the center tap of the primary coil 74 and the opposite ends of the primary coil 74 are connected across two terminals of the rectifier bridge 72. The terminals of the bridge 72 to which the secondary coil 74 is connected are formed by movable taps 75, 76 of resistances 77, 78 connected into the bridge circuit. The resistance 77 has one end connected to a terminal 80 of the bridge by a rectifier 81 which conducts current flowing from the tap 75 of the resistance 77 to the terminal 80, and the other end of the resistance 77 is connected to a terminal 82 through a resistance 83 and a rectifier 84 which conducts current flowing from the terminal 82 to the tap 75. Similarly, the resistance 78 has one end connected to the terminal 82 by a rectifier 86 which conducts current flowing from the tap 76 of the resistance 78 to the terminal 82, and the other end of the resistance 78 is connected to the terminal 80 through a resistance 87 and a rectifier 88 which conducts current flowing from the terminal 80 to the movable tap 76 of the resistance 78. The terminals 80, 82 are connected together by a pair of series connected resistors 90, 91 and the junction between the resistors 90, 91 is connected by a connection 92 to one side of the output coil 66 of the tachometer and to one end of the resistance 68 so that the portion of the voltage of the resistance 68 across the portion 68a thereof between the movable tap 70 and the connection 92 is applied to the primary coil of the transformer 73 through the chopper bridge 72. From the above described connections and by reference to FIG. 1, it can be seen that the voltage appearing across the portion of the resistor 68a will cause a current to flow from the center tap connection of the primary coil 74 through the coil portions 74a, 74b and a leg of the chopper bridge 72. If the movable tap 70 of the resistance 68 is positive, the current will flow from the tap 70 to the center tap of the coil 74, from the center tap through the coil portion 74a to the movable tap 75 of the resistance 77 and from the resistance 77 through the rectifier 81 to terminal 80 and back to the tachometer output circuit through the resistance 90 and the connection 92. At the same time, current will be conducted from the center tap of the primary coil 74 through coil portion 74b, the movable tap 76 of resistance 78 and the rectifier 86 of the chopper bridge 72 to terminal 82, and from the terminal 82 of the bridge through the resistance 91 and back to the output circuit of the tachometer through the connection 92. An alternating current can be produced in the primary coil of the transformer 73 by applying an alternating current across the terminals 80, 82. On alternate cycles of the alternating current, the rectifiers 81, 86 will be blocked and the current will flow alternately in the coil portion 74a, 74b of the transformer 73. To apply the alternating current, a transformer 96 is provided having a primary coil 97 energized with an alternating current of a frequency which is the same as the frequency of the power supply for L1, L2, L3, and a secondary coil 98 which is connected across the terminals 80, 82 through a reversing switch 100 which is reversible to change the phase of the voltage applied to the bridge 72. Preferably, the circuit connecting the secondary coil 98 to the chopper bridge 72 includes a potentiometer-type resistance 101 for varying the magnitude of the voltage applied to the bridge. The phase of the output voltage of the transformer 96 is selected so that the alternating current signal appearing at the secondary of the transformer 73 is in bucking relationship to the signal applied through the input resistor 45 and to the signal from the armature current. The signal from the transformer 73 is amplified by an amplifier 103, the output of which is connected to the terminal 38 of amplifier 40 through an input resistor 104.

It will be noted that the phase of the signal applied to the input of amplifier 40 for acceleration will change upon the reversal of the motor 10 due to the fact that the polarity of the D.C. signal from the tachometer 64 changes when this reversal takes place.

In summary, the control signal applied through the input resistor 45 has a phase which determines the direction of movement of the motor 10 and a magnitude which determines the rate of operation of the motor 10. In addition to the control signal 45, feed-back signals are provided which are indicative of the velocity of the motor, and preferably of the rate of change of the velocity, and, in addition, a feed-back signal which is a function of the armature current. The feed-back signal which is a function of the rate of change of the velocity of the motor tends to prevent the feedback which is a function of the armature current from causing the motor to overshoot the desired rate of speed.

Figure 4:
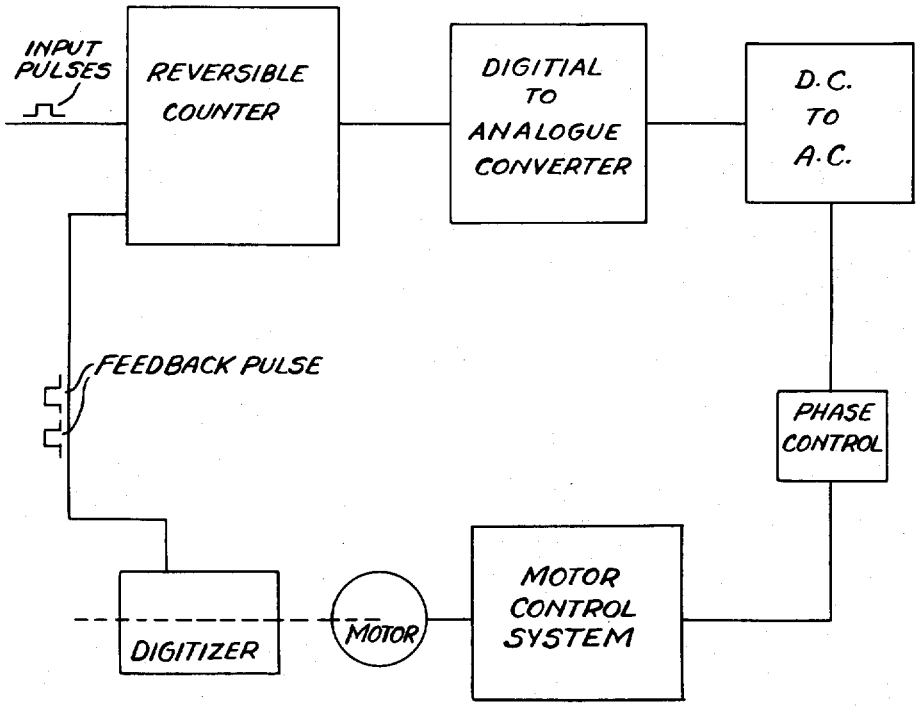
FIG. 4 is a block diagram of a servo control system embodying the present invention.

The control signal applied to the resistor 45 may be proportional to the difference between the angular position of the motor 10 and a desired angular position of the motor. For example, the described motor control system may be incorporated into a servo system where a plurality of pulses, each indicating a desired increment of movement of the armature 12, are applied to the input of a bidirectional or reversible counter shown schematically in FIG. 4. The bidirectional counter sums the pulses applied thereto and a digital-to-analogue converting circuit connected to the output of the counter provides an analogue voltage which is of a magnitude indicative of the number stored in the counter. This voltage may be converted to a varying A.C. voltage and applied through a phase control circuit and the input resistor 45 to the amplifier 40. The phase control circuit may be a numerically controlled switching circuit to reverse the phase of the signal from the converting circuit. As the motor rotates in response to the control voltage applied through the resistor 45, pulses indicating that the motor has moved an increment are fed back to the bidirectional counter and subtracted from the number stored therein. The number in the counter is proportional to the difference in the position registered in the counter by summing the input pulses and the immediate angular position of the motor and the magnitude of the control signal will be proportional to this difference.

From the foregoing, it can be seen that the present invention provides a new and an improved motor control system which is adapted to effect the operation of a motor in accordance with an electrical control signal, the system being such that the motor responds quickly to the control signal with a minimum of hunting. The disclosed system finds particular utility in controlling the direction and rate of operation of a reversible D.C. motor and includes means for deriving an A.C. feed-back signal from the armature circuit of the motor, the feed-back signal having a phase dependent upon the direction of torque of armature torque and a magnitude dependent upon the magnitude of armature current.

While the preferred embodiment of the present invention has been described in considerable detail, it is hereby my intention to cover all modifications, constructions and arrangements thereof which fall within the ability of those skilled in the art and within the scope and spirit of the present invention.

Having thus described my invention, I claim:

1. A control system for a direct current motor comprising a source of A.C. current, a pair of grid controlled rectifying tubes connecting said source to energize the armature of said motor with a unidirectional current which determines the speed of said motor, means providing a first signal component indicative of a desired rate of movement, means for deriving second and third signal components dependent on the velocity and rate of change of velocity of said motor, means responsive to armature current to provide a fourth signal component dependent on the magnitude of the armature current, circuit means combining said first and fourth components in an additive relationship to each other and said second and third components in a bucking relationship to the first and fourth components when said motor is accelerating and applying the resultant signal to the grids of said tubes to control the conduction thereof as a function of said signal.

2. A motor control system as defined in claim 1 wherein said motor is reversible and operates in a direction dependent on the phase of a signal applied to said tubes and said signal components are A.C. components.

3. In a motor control system having an amplifier comprising grid controlled rectifier tubes connecting a source of A.C. power to the armature of a direct current motor to energize the motor armature with a current whose magnitude and polarity is dependent on the magnitude and phase of an A.C. voltage applied to the input of the amplifier, means for applying an A.C. control signal having a magnitude and phase indicative of a desired rate and direction of movement to said amplifier, said signal having the same frequency as said source, means for deriving first, second, and third A.C. feed-back voltages which are respectively dependent on armature current, motor speed, and rate of change of motor speed, said first feed-back signal having a phase dependent on the polarity of armature current, the phase of said third signal being dependent on the direction of change of the velocity of said motor, and means connecting said feed-back signals to the input of said amplifier with said first feed-back signal in additive relationship to said A.C. control signal and said second feed-back signal in bucking relationship to said A.C. control signal and said third feed-back signal in bucking relationship for changes in velocity which correspond to acceleration of said motor, said relationships being for motor operation in the direction corresponding to the phase of the control signal.

4. In a motor control system as defined in claim 3 wherein the means providing said third feed-back signal comprises an acceleration tachometer having an output of one polarity for acceleration in one direction of motor operation, and for deceleration in the opposite direction of motor operation, and the opposite polarities for acceleration and deceleration when the direction of motor operation is reversed.

5. In a motor control system for a reversible D.C. motor having field and armature windings and wherein the polarity of the armature current is reversed to reverse the direction of motor rotation, said system including a power amplifier for energizing said motor with a current of a polarity and magnitude dependent upon the phase and magnitude, respectively, of a control signal applied to the input thereof, means responsive to the armature current to provide an A.C. feed-back signal having a magnitude and phase dependent upon the magnitude and polarity, respectively, of the armature current, circuit means responsive to the speed and direction of movement of said motor to provide a second feed-back signal having a magnitude and phase respectively dependent on the speed and direction of operation of said motor, and means applying said feed-back signals to the input of said amplifier in out-of-phase relationship with each other and with said first feed-back signal in phase with said control signal for motor operation in the direction corresponding to the phase of said control signal.

6. In a control system for a reversible direct current motor wherein an A.C. power source is connected to energize the armature circuit by an amplifier comprising grid controlled rectifier tubes connected to be rendered conductive on different half cycles of the A.C. power source, said amplifier being responsive to an A.C. control signal applied thereto to effect operation of the motor at a rate and in a direction determined by the magnitude and phase, respectively, of the A.C. control signal, one tube or the other being rendered conductive for a greater portion of its particular half cycle by said control signal to operate the motor in a respective direction, the improvement which comprises means for applying an A.C. feed-back signal to the input of said amplifier in additive relationship to said control signal and having a magnitude dependent on the magnitude of the armature current and a sense dependent on the direction of armature current comprising means responsive to current through respective ones of said tubes to provide first and second voltages having opposite polarities upon conduction of said first and second tubes respectively, a transformer having a secondary connected to the input of said amplifier and a primary, and means applying each of said voltages to said primary to energize the primary in the same direction, the given relationship of said feed-back signal to said control signal being for motor operation in the direction corresponding to the phase of the control signal.

7. In a motor control system, the structure as defined in claim 5 and further comprising means providing a third signal having a magnitude and phase respectively dependent on the rate and direction of change of motor velocity and circuit means applying said third signal to the said input of said power amplifier in bucking relationship to said control and first-mentioned feedback signal when said motor is accelerating in the direction corresponding to the phase of said control signal.

*8. A control system for a direct current motor comprising a source of A.C. current, a power amplifier connecting said source to energize the armature of said motor with a unidirectional current which determines the speed of the motor, said amplifier comprising an electric rectifying valve of the breakdown type having principal electrodes for conducting the motor energizing current and a control element to which a signal of predetermined magnitude is applied to effect a breakdown of the valve and render the valve conductive, means providing a first signal component indicative of a desired rate of movement, means for deriving second and third signal components dependent on the velocity and rate of change of velocity of said motor, means responsive to armature current to provide a fourth signal component dependent on the magnitude of the armature current, circuit means combining said first and fourth components in additive relationship to each other and said second and third components in a bucking relationship to the first and fourth components when said motor is accelerating and for applying the resultant signal to the control element and to one electrode of said valve to control the breakdown thereof in accordance with said signal.*

*9. A motor control system as defined in claim 8 wherein said motor is reversible and said valve conducts to operate said motor in one direction and a multipilicity of said components are A.C. components having senses which are related to the direction of rotation of the motor and are applied to said control element and said one principal electrode as A.C. signals.*

References Cited in the file of this patent or the original patent

UNITED STATES PATENTS

| | | |
|---|---|---|
| 2,297,719 | Satterlee | Oct. 6, 1942 |
| 2,437,140 | Waldie | Mar. 2, 1948 |
| 2,528,688 | Chine et al. | Nov. 7, 1950 |
| 2,550,105 | Cotner | Apr. 24, 1951 |
| 2,653,289 | Kelling | Sept. 22, 1953 |